United States Patent [19]
Midden

[11] Patent Number: 5,305,685
[45] Date of Patent: Apr. 26, 1994

[54] GROUNDS REMOVAL CENTRIFUGE

[75] Inventor: William E. Midden, Springfield, Ill.

[73] Assignee: BUNN-O-MATIC Corporation, Springfield, Ill.

[21] Appl. No.: 58,275

[22] Filed: May 4, 1993

[51] Int. Cl.⁵ .............................................. A47J 31/44
[52] U.S. Cl. ................................ 99/289 R; 210/376; 210/784
[58] Field of Search ............ 99/275, 279, 287, 289 R, 99/289 D, 290, 300, 302 R, 302 C; 426/433; 210/372, 376, 781, 784

[56] References Cited

U.S. PATENT DOCUMENTS

| | | | |
|---|---|---|---|
| 1,869,720 | 8/1932 | Strand | 99/302 C |
| 3,683,790 | 8/1972 | Black et al. | |
| 3,967,546 | 7/1976 | Cailliot | 99/289 R |
| 4,434,052 | 2/1984 | Mulhaupt | 210/376 |
| 5,134,925 | 8/1992 | Bunn et al. | |

Primary Examiner—Robert W. Jenkins
Attorney, Agent, or Firm—Trexler, Bushnell, Giangiorgi & Blackstone, Ltd.

[57] ABSTRACT

A disposal device for disposing of spent beverage brewing substances for use with a beverage brewing apparatus. The beverage brewing apparatus is the type which uses a beverage brewing substance which is disposed in a brewing chamber and infused with a liquid to produce a brewed beverage. A drain conduit extends from the brewing chamber and communicates with the substance disposal device for removing a slurry of moist beverage brewing substance and liquid waste from the brewing chamber of the apparatus into the disposal device. The disposal device includes a housing which houses a strainer basket. The strainer basket is rotatably retained in the housing. The drain conduit from the beverage brewing apparatus deposits the spent beverage brewing substance inside of the strainer basket. The strainer basket is rotated to centrifugally remove a liquid component of the spent beverage brewing substance and drain such liquid out through a drain port in the housing. A resulting drained component of the spent beverage brewing substance is removed by a removing device which scrapes the drained component from the inside surface of the strainer basket and deposits the drained component in a collection bin.

17 Claims, 5 Drawing Sheets

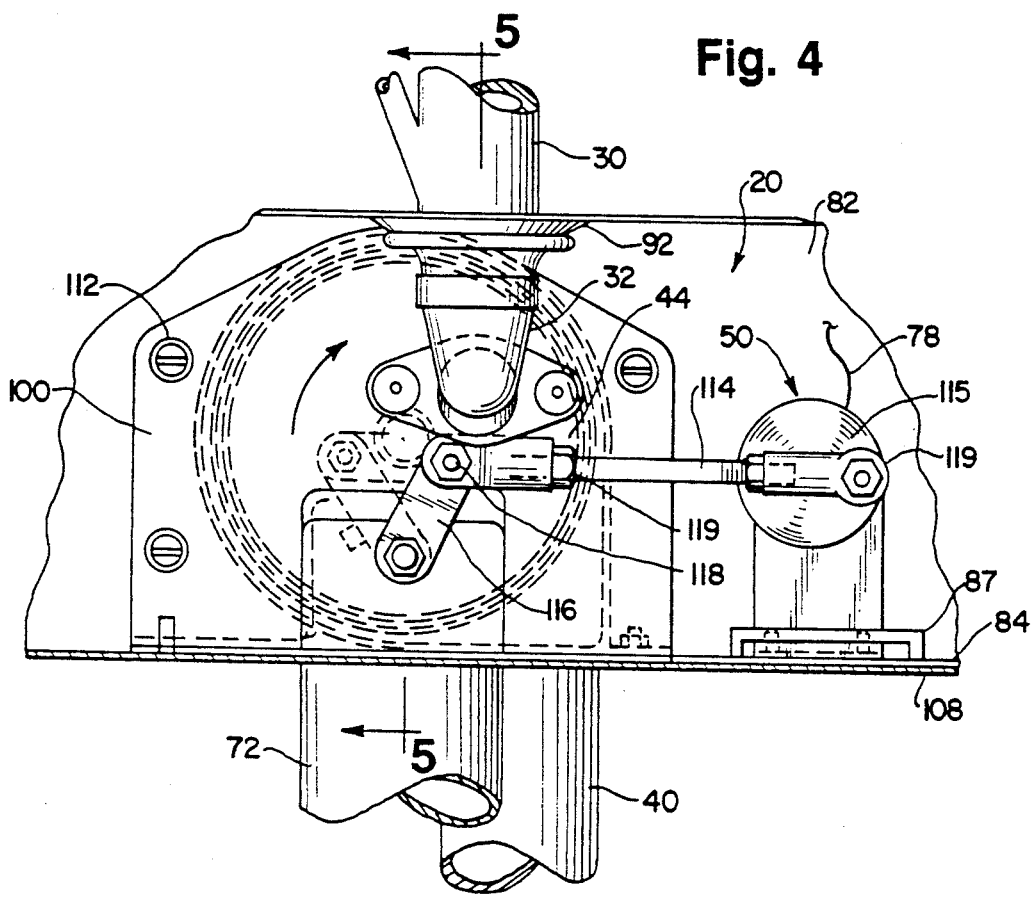

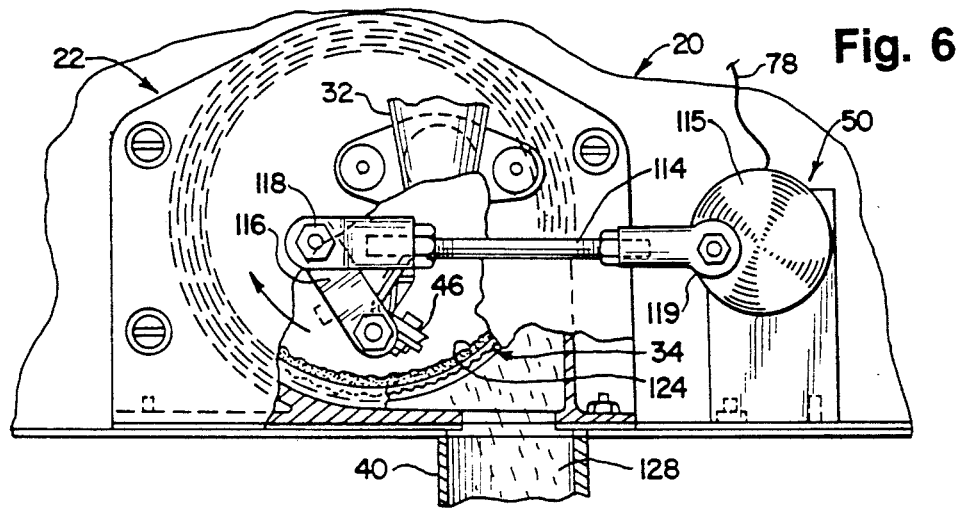
Fig. 6
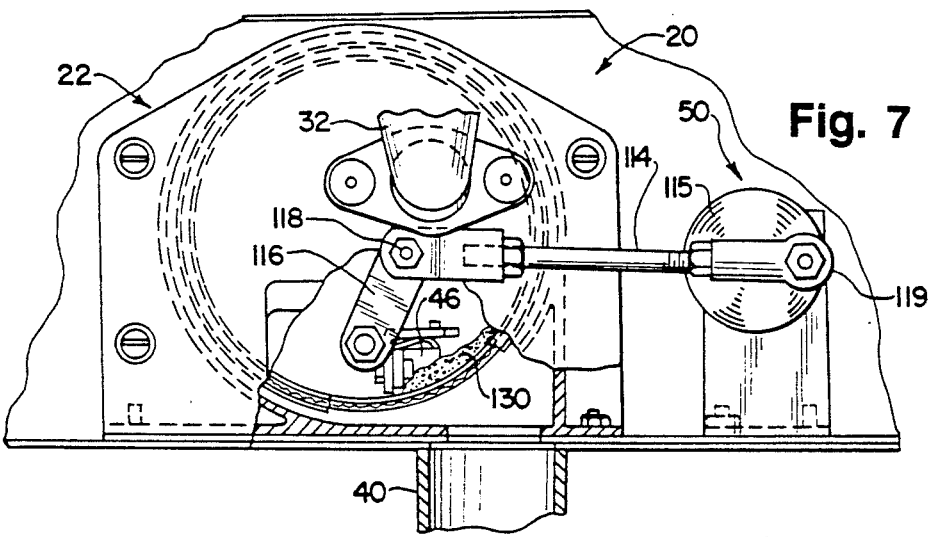
Fig. 7
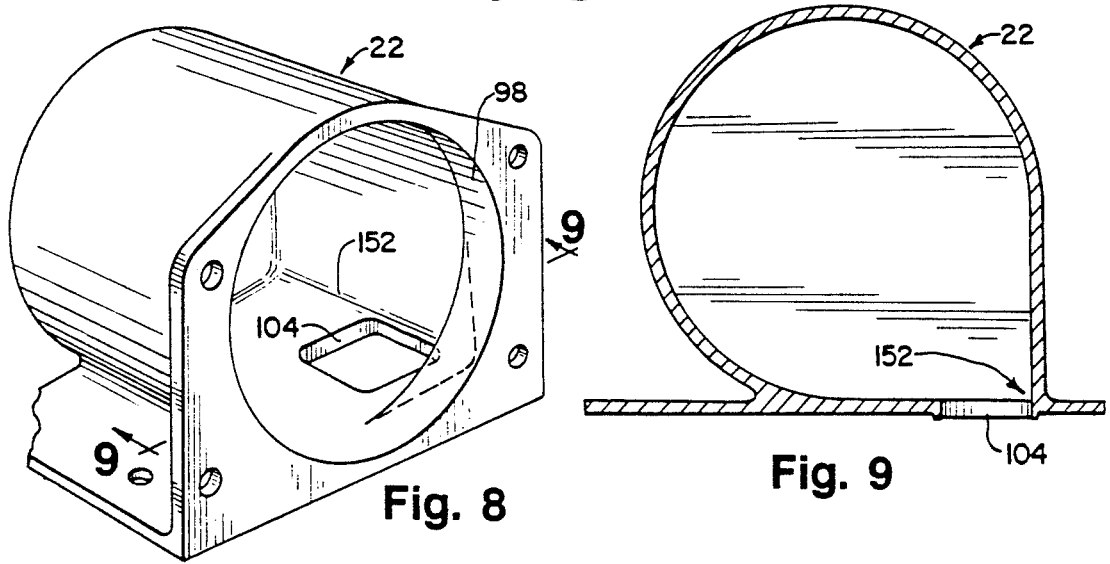
Fig. 8
Fig. 9

GROUNDS REMOVAL CENTRIFUGE

BACKGROUND OF THE INVENTION

The present invention pertains to devices for disposing of spent beverage brewing substances from an automatic beverage brewing apparatus. More particularly, the present invention pertains to devices which receive a spent brewing material, containing waste liquids, from a beverage brewing apparatus and extract the waste liquid portion of the spent beverage brewing substance.

Automatic beverage brewing apparatus are commonly used in high volume applications such as restaurants, catering organizations and other high volume food production institutions. A typical automatic beverage brewing apparatus has a body which positions a funnel below a heated water source. The funnel contains a beverage brewing substance which is infused with heated water dispensed into the funnel to produce a brewed beverage. A brewed beverage is drained from the funnel into a serving decanter positioned underneath the funnel.

Such a beverage brewing apparatus requires that the beverage brewing substance be measured and deposited into the funnel for each batch of beverage produced. Additionally, this activity inherently requires the removal of the spent brewing substance after it has been infused with hot water and a brewed beverage produced therefrom. The need to fill the funnel with a beverage brewing substance and remove the spent substance from the funnel is labor intensive and prone to error due to mismeasurement or failure to remove the spent brewing substance from the funnel before producing another batch of brewed beverage.

Recently, automatic beverage brewing apparatus have been produced which substantially automate the beverage brewing process. Such an apparatus is shown in pending U.S. Pat. No. 5,134,925 to Bunn et al., issued Aug. 4, 1992. The apparatus shown in Bunn et al. includes an automatic brewing substance dispenser for dispensing a predetermined amount of beverage brewing substance into a brewing chamber. The brewing process is automated including automatically controlled brewing, dispensing, and chamber cleaning. After the brewing process is complete, the spent brewing substance is exhausted from the brewing chamber through a drain conduit into a spent beverage brewing substance basket or waste pail.

A problem arises, however, in handling the spent brewing substance. The volume of the brewing substance and waste water requires frequent periodic removal and dumping. In other words, it would be desirable to accumulate the spent brewing substance from numerous brewing cycles in order to reduce the amount of manual labor required in servicing the brewing apparatus.

Another problem arises with the accumulation of spent brewing substance such that a large proportion of the waste product is waste water which is retained by the brewing substance itself during the brewing process. Additionally, it is common for brewing apparatus, such as the one shown in Bunn et al., to dispense waste water used to clean the brewing chamber into the common waste collection hopper. As such, a substantial quantity of water must be dealt with in disposing of the spent brewing substance. Therefore, it would be desirable to provide a device which drains off the liquid portion of the spent beverage brewing substance leaving only the dried spent brewing substance. Additionally, it is desirable to remove the liquid component of the spent beverage brewing substance in order to prevent the moist mixture from harboring and developing malodorous bacteria and organisms.

One possible solution to the waste material problem is to simply drain the combined slurry of spent brewing substance and waste water down a common drain. This solution, however, may not be feasible in some areas which restrict the amount of material which can be flushed down a waste sewer along with waste liquids. Further, the plumbing requirements to flush substantial quantities of solid materials may not be available or may be cost prohibitive since they are substantially greater than those for merely draining water and other liquids.

Another problem that arises with the disposal of spent brewing substances is that these substances create a great deal of steam and moisture which, if allowed to travel into the brewing apparatus, may create many problems. For example, when spent brewing substances are disposed in an open collection basket the steam rises off of the substance as the substance cools in the collection basket. Since such baskets are positioned at the bottom of the brewing apparatus, the steam rising off of the spent brewing substance rises through the apparatus. While the brewing chamber is designed to brew substances, it is difficult to protect the internal components of the brewing apparatus from the detrimental effects of the rising steam. In particular, when the brewing apparatus includes a brewing substance dispenser, the steam may have an extremely detrimental effect on the brewing substance retained in the substance dispenser. For example, if ground coffee is retained in the substance dispenser, the steam may cause the ground coffee to cake and therefore not be properly dispensed into the brewing chamber.

As such, it is desirable to provide a device for disposing of spent beverage brewing substances which can be associated with an automatic beverage brewing apparatus to receive and retain spent brewing substances and waste water and drain the liquid portion therefrom. Further, it is desirable to provide a device which prevents steam from the spent brewing substance from escaping.

OBJECTS AND SUMMARY OF THE INVENTION

A general object of the present invention is to provide a device for collecting moist, spent brewing substances and waste water from a brewing apparatus and separating the liquid portion of such waste from the brewing substance to effectively drain the brewing substance.

Another object of the present invention is to provide a device which extracts a liquid portion of the moist, spent brewing substance from a collection area of the device and then removes the drained brewing substance.

Briefly, and in accordance with the foregoing, the present invention envisions a device for disposing of spent beverage brewing substances for use with a beverage brewing apparatus. The beverage brewing apparatus is the type which uses a beverage brewing substance which is disposed in a brewing chamber and infused with a liquid to produce a brewed beverage. A drain conduit extends from the brewing chamber and communicates with the substance disposal device for removing a slurry of moist beverage brewing substance and liquid waste from the brewing chamber of the apparatus into the disposal device. The disposal device includes a housing which houses a strainer basket. The strainer basket is rotatably retained in the housing. The drain conduit from the beverage brewing apparatus deposits the spent beverage brewing substance inside of the strainer basket. The strainer basket is rotated to centrifugally remove a liquid component of the spent beverage brewing substance and drain such liquid out through a drain port in the housing. A resulting drained component of the spent beverage brewing substance is removed by a removing device which scrapes the drained component from the inside surface of the strainer basket and deposits the drained component in a collection bin.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 4 is a partial fragmentary, cross sectional, side elevational view taken along line 4—4 in FIG. 3 showing the disposal device;

FIG. 5 is a partial fragmentary, cross sectional, side elevational view taken along line 5—5 in FIG. 3;

FIG. 6 is a partial fragmentary, cross sectional view showing the operation of a removal device employed in the present invention in which a scraper blade of the removal device is positioned out of the way of a rotating strainer basket when moist brewing substance is introduced into the strainer basket;

FIG. 7 is a partial fragmentary, cross sectional view showing the removal device as shown in FIG. 6 in which the scraper blade has been operated to accumulate and eject a drained component of the beverage brewing substance from the inside surface of the strainer basket;

FIG. 8 is a perspective view of a housing component of the present invention;

FIG. 9 is a cross sectional view of the housing taken along line 9—9 in FIG. 8;

DETAILED DESCRIPTION OF THE INVENTION

Figure 1:
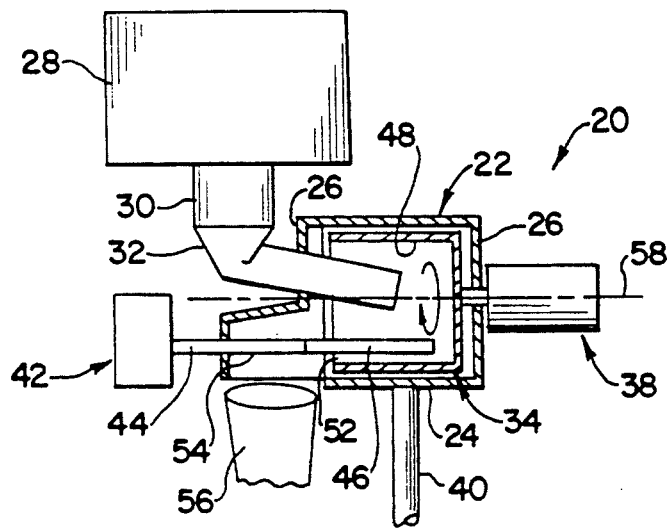
FIG. 1 is a simplified diagrammatic representation of a substance disposal device of the present invention.

While the invention may be susceptible to embodiment in different forms, there is shown in the drawings, and herein will be described in detail, embodiments of the invention with the understanding that the present disclosure is to be considered an exemplification of the principles of the invention and is not intended to limit the invention to that as illustrated and described herein.

Referring now to the drawings, wherein like parts are designated by the same reference numerals throughout the figures, a simplified diagrammatic representation of a spent beverage brewing substance disposal device or disposal device 20 in accordance with the present invention as shown in FIG. 1. The disposal device 20 includes a housing 22 having a base 24 and walls 26. The disposal device 20 is positioned beneath a beverage brewing apparatus 28. The beverage brewing apparatus 28 has a drain conduit 30 through which a slurry of spent beverage brewing substance and/or waste liquid is disposed into a receiving tube 32 which extends through a wall 26 of the housing 22.

Beverage brewing substance, slurry, and/or liquid which is deposited into the receiving tube 32 flows into the housing 22. A strainer basket 34 is disposed in the housing for receiving the slurry of the spent beverage brewing substance deposited therein by the receiving tube 32. The walls 36 of the strainer basket 34 are porous and allow a liquid component of the slurry to flow therethrough but retain a material component inside of the strainer basket 34.

A rotating device 38 is operatively associated with the strainer basket 34 to rotate the strainer basket 34 thereby imposing centrifugal forces on moist grounds deposited therein which separate the liquid component from the material component. As the strainer basket 34 is rotated, the liquid component is thrown outwardly onto the walls 26 and base 24 of the housing 22 and drained out of the disposal device 20 through a drain port 40 which communicates with the housing 22.

The present invention as illustrated provides a removal device 42 for mechanizing the removal of the drained material component from the strainer basket 34. The removing device 42 includes an arm 44 which extends through the housing 22 and into the strainer basket 34. A blade 46 is attached at a position inside of the strainer basket 34 to remove the drained material component from an inside surface 48 of the strainer basket 34 without damaging the porous walls 36. A drive mechanism 50 is positioned outside of the housing 22 and is operatively coupled to the arm 44 for positioning the blade 46 relative to the inside surface 48 of the strainer basket 34. In a simpler form of the invention, the drained material component remaining on the inside of the strainer basket 34 after a rotating cycle may be manually removed.

While the strainer basket 34 is initially rotated by the rotating device 38, the blade 46 is positioned out of the way of the slurry dispensed into the strainer basket 34. After a sufficient period of time to centrifugally remove a substantial portion of the liquid component from the spent beverage brewing substance, the blade 46 on the arm 44 is positioned by the drive mechanism 50 to interfere with the path of travel of the drained material component. Interference with the drained material component spinning inside the strainer basket 34 causes the material to build up against the blade 46 and be ejected from the inside surface 48 of the strainer basket 34 out through the enlarged mouth 52. The blade 46 directs the drained component outwardly through an enlarged mouth 52 of the strainer basket 34 and through an opening 54 in the housing 22. The drained material component which is removed through the opening 54 in the housing 22 may be collected in an accumulation container 56 positioned proximate to the opening 54.

Having briefly described the general aspects of the present invention, it should be noted that other removing devices 42 for removing the drained material component from the strainer basket 34 may be provided. For example, a vacuum attachment may be attached to an end of the arm 44 instead of the blade 46. In this embodiment the drive mechanism 50 moves the arm 44 with the vacuum attachment on the end thereof into an appropriate position in the strainer basket 34 to collect the drained component of the spent beverage brewing substance. With this in mind, the disposal device 22 could be repositioned such that an axis of rotation 58 of the rotating strainer basket 34 could be oriented in a vertical position instead of the horizontal position as shown in FIG. 1.

Figure 2:
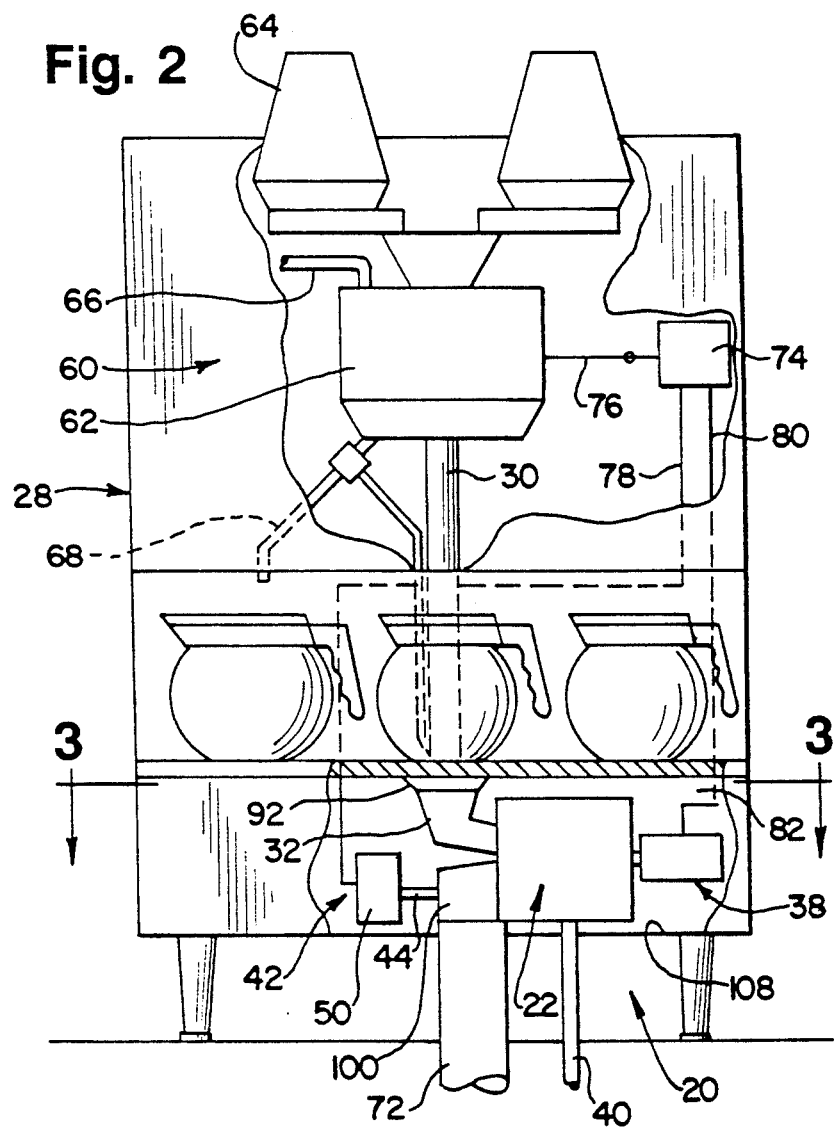
FIG. 2 is a partial fragmentary front elevational view of a diagrammatic representation of a beverage brewing apparatus employing the substance disposal device of the present invention.

Turning now to FIGS. 2-11 to describe the structure and function of the present invention in greater detail, FIG. 2 provides a partial fragmentary front elevational view of a beverage brewing apparatus 28 showing the disposal device 20 positioned below a brewing device 60. The brewing device 60 includes a brew chamber 62 in which a brewing substance from a hopper assembly 64 (or manually disposed into the brew chamber 62) is infused with a heated liquid dispensed from a heated liquid line 66. Once the brewing substance is infused, a brewed beverage is drained out of the brew chamber 62 through a discharge line 68 for dispensing into a serving carafe 70. Upon the completion of such a beverage brew cycle, the brew chamber 62 is automatically cleaned and a slurry of moist beverage brewing substance used during the brew cycle and waste liquid, either left over from the brew cycle or used in cleaning the brew chamber 62, is drained through the drain conduit 30.

The disposal device 20 is positioned below and in communication with the drain conduit 30. The receiving tube 32 mates with a bottom end 71 of the drain conduit 30 for directing the slurry into the housing 22 for separation. The liquid component separated from the slurry is drained through the drain port 40 and out into an appropriate sewage line. The drained material component is exhausted through the opening 54 and into an exhaust tube 72 into an accumulation container 56 positioned therebelow (see FIG. 1).

A controller 74 is coupled to the brewing apparatus 28 (shown diagrammatically by control line 76) to control brewing and cleaning cycles. The controller 74 controls the quantity of brewing substance dispensed into the brew chamber 62 and the water used to infuse the brewing substance. Further, the controller 74 operates the water lines of the beverage brewing apparatus 28 to rinse the brew chamber 62 at the end of a brewing cycle. As such, the production of brewed beverage is highly automated and involves minimal human interaction.

The substance disposal device 20 of the present invention further automates the brewing process such that a user essentially only has to place a brewing substance in the hopper assembly 64 and remove a drained material component from an accumulation container 56. The intervening steps in the brewing process are all preprogrammed in the controller 74 and carried out by the mechanisms in the beverage brewing apparatus 28 and the disposal device 20.

The controller 74 also is used to control the removal device 42 over control lines 78 (connected to the drive mechanism 50) and control line 80 (connected to the rotating means 38). At the end of a brewing cycle, and during a rinse cycle, the controller 74 signals the rotating means 38 to rotate the strainer basket 34 about the axis of rotation 58 thereby initiating a disposal cycle. Once the strainer basket 34 is rotating, the slurry of beverage brewing substance is introduced into the strainer basket 34 whereupon the liquid component is stripped out of the spent brewing substance by centrifugal forces. Rotation of the strainer basket 34 continues throughout the rinsing cycle whereupon additional spent beverage brewing substance and waste water may be flushed from the brew chamber 62.

After completion of the rinsing cycle, the strainer basket 34 continues to rotate for an additional predetermined period of time to remove additional liquid component of the spent beverage brewing substance. At a predetermined time, the drive mechanism 50 operates the arm 44 to move the blade 46 in close proximity to the inside surface 48 of the strainer basket 34 to remove the drained material component therefrom. After a predetermined period of time, the drive mechanism 50 disengages the blade 46 from its material removing position and the rotating means 38 stops rotating the strainer basket 34. The disposal device 20 is once again ready for another disposal cycle.

Figure 3:
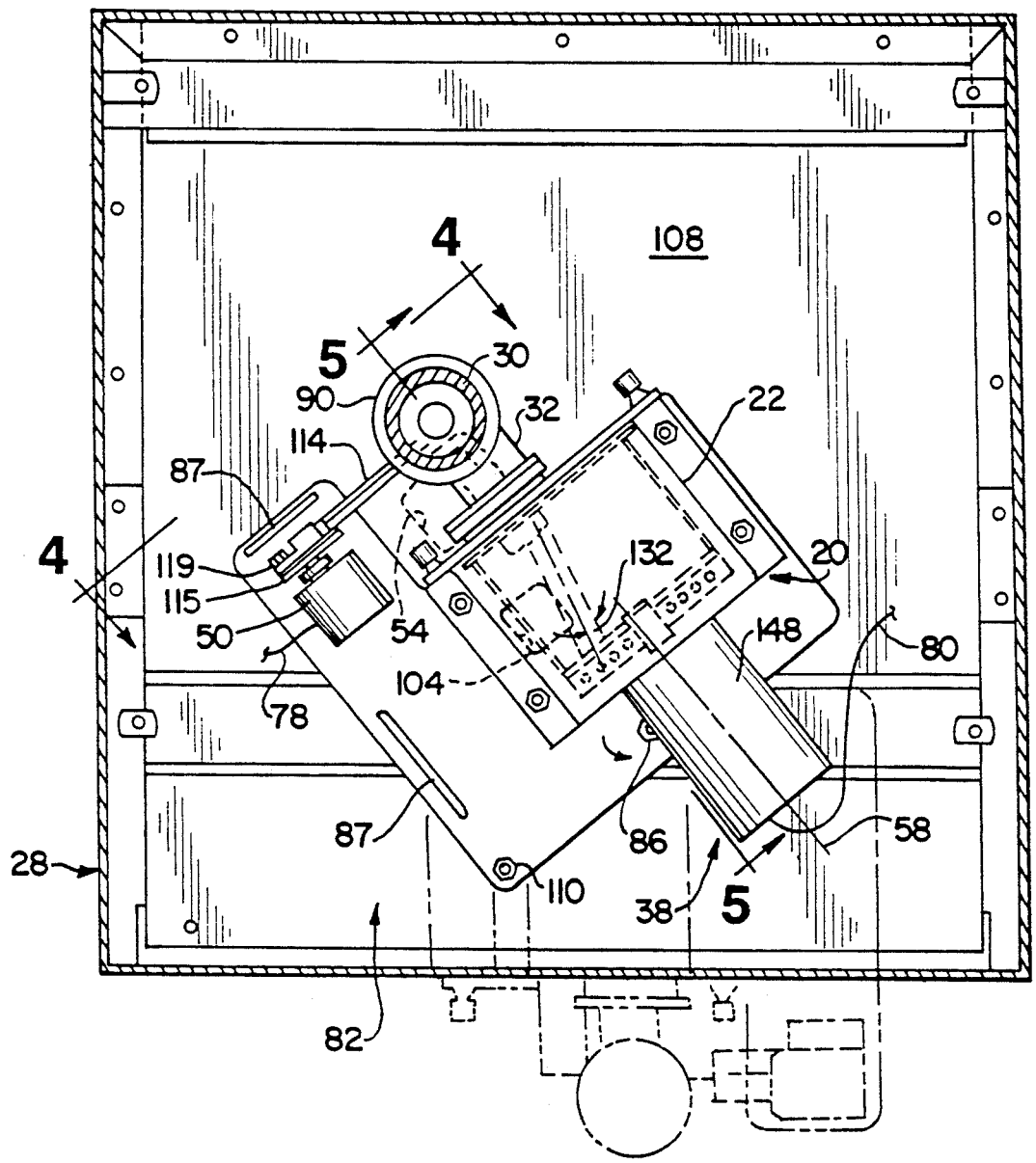
FIG. 3 is a top plan view of the present invention taken along line 3—3 as shown in FIG. 2 introducing ( additional details of the present invention.

Having now described the overall structure and operation of the present invention, reference is now made to the physical relationship of the disposal device 20 as it is positioned in a lower compartment 82 of the beverage brewing apparatus 28. FIG. 3 provides a plan view, as taken along line 3—3 in FIG. 2, of the disposal device 20 attached to a base 84. FIG. 3 and the subsequent figures introduce additional structural details which were omitted from FIGS. 1 and 2 to simplify the explanation of the general structure and operation of the invention.

FIG. 3 provides a phantom line outline of the disposal device 20 on the base 84 showing the install position (solid line) and a removed position (phantom line) of the disposal device 20. The base 84 is pivotably positioned in the lower compartment 82 and is pivotably retained at a single point by a pivot pin 86. The ability to pivot the disposal device 20 attached to the base 84 about the pivot pin 86 allows the device 20 to be concealed in the lower compartment 82 when in use and to be pivoted outwardly for maintenance. Handles 87 are attached to the base structure 84 for facilitating pivoting the base structure 84 into and out of the lower compartment 82. Further details of the structure and function of the base structure 84 will be provided hereinbelow.

The operation of the disposal device 20 is described in further detail with reference to FIG. 3 and the enlarged front and side elevational views as shown in FIGS. 5 and 4. As shown in FIG. 5, the receiving tube 32 includes a funnel portion 90. When the disposal device 20 is positioned inside of the lower compartment 82, the funnel portion 90 couples with an adapter 92 attached to the bottom end 71 of the drain conduit 30. The adapter 92 is sized and dimensioned for engaging a mouth 96 of the funnel portion 90 to prevent the escape of fluids into the lower chamber 82 should, for example, slurry and water backup into the drain conduit 30. The seal between the mating adapter 92 and the mouth 96 of the funnel portion 90 is easily disengaged when the base structure 84 is pivoted to remove the disposal device 20 from the lower compartment 82.

As shown in FIGS. 4 and 5, the housing 22 includes an enlarged aperture 98 formed through one of the walls 26. The enlarged aperture 98 is dimensioned for receiving the strainer basket 34 therethrough. A cap body 100 overlies the enlarged aperture 98 for sealing the housing 22. The cap body 100 includes the disposal opening 54 formed therethrough and a bore 102 to allow the arm 44 to extend therethrough. The disposal opening 54 is positioned over a coincidental base opening 104 which is aligned with an apparatus opening 106 formed through a bottom surface 108 of the brewing apparatus 28 when the base 84 is positioned inside the lower compartment 82. In a similar manner a drain opening 109 formed in the bottom of the housing 22 is positioned over a coincidental compartment hole 111 formed through the bottom of the compartment 82.

It should be noted that the mating adapter 92 engages the funnel portion 90 and the openings 54,104,106 and 109,111 aligned when the base 84 is inserted into the lower compartment 82. A locking pin 110 (as shown in FIG. 3) is engaged with the bottom surface 108 to retain this position. The cap body 100 is easily removable from the housing 22 to provide access to the inside of the housing 22 by removing an arrangement of fasteners 112 which retain the cap body 100 on the housing 22. The ability to easily remove the cap body 100 allows for easy cleaning of the housing 22 as well as the cap body 100 and arm 44.

In describing the arm 44, it should be noted that FIGS. 1 and 2 describe the arm 44 in general terms. The arm 44 as shown in FIGS. 4–7, 10 and 11 further includes a number of components. More specifically, the arm 44 includes primary arm 114 attached at one end to a rotor 115 which is rotated by the drive mechanism 50 and at a second end to an intermediate link 116 by a rotatable and removable pin 118. The connection between the ends of the arm 114 and the rotor 115 and intermediate link 116 are quick disconnect ball and socket joints, 119, 119. The intermediate link 116 is fixed to a shaft 120 such that movement of the intermediate linkage 116 rotates the shaft 120 in the shaft bore 102. Horizontal movement of the arm 114 by the drive mechanism 50 causes the intermediate link 116 to rotate the shaft 120.

With reference to FIG. 6, it can be seen that the arm 44 is normally positioned so that the blade 46 does not interfere with path of travel of beverage brewing substance 124 being rotated in the strainer basket 34. Suitable drive mechanisms 50 include electrical solenoids, electric motors or other driving mechanisms which can impose a force on the arm 44, or other suitable linkage, to move the blade 46 into and out of the material path which, when not activated, releases the arm 114. As the strainer basket 34 is rotated, a liquid component 128 is centrifugally stripped from the beverage brewing substance 124 thereby leaving only a drained or dried material component 130 as shown in FIG. 7.

Activation of the drive mechanism 50 causes horizontal movement of the arm 114 towards the intermediate linkage 116, attached thereto by means of the pin 118, to rotate the shaft 120 and cause the blade 46 to block the movement of the drained material component 130 being rotated by the rotating strainer basket 34. As shown in FIGS. 3, 6, 7, and 11, the shaft 120 is positioned at an angle 132 relative to the axis of rotation 58 of the strainer basket 34. This angle 132 results in the angled or foreshortened appearance of the blade 46 as shown in FIGS. 6 and 7. The drained material component 130 builds up against a facing surface 131 of the scraper 46 now blocking the path of the material rotated by the rotating strainer basket 34. As such, the blade 46 is angled and tends to throw the drained component 130 towards the enlarged mouth 52 of the strainer basket 34 and out through the disposal opening 54.

With reference now to FIGS. 4–11, the operation of the strainer basket 34 in the housing 22 will be described. As shown with greater specificity in FIG. 5, the strainer basket 34 includes porous walls 36. The porous walls 36 are constructed of a generally rigid material which has a plurality of holes 134 formed therethrough. A smaller mesh material (as indicated by the shaded area 136) overlies the inside surface of the walls 36 covering the holes 134. The mesh material 136 provides a porous surface through which fluid will pass but prevents blockage of the holes 134 by material disposed in the strainer basket 34. As best shown in FIG. 5, a hollow chamber or "false bottom" 138 is formed at the rear of the strainer basket 34. The false bottom 138 is formed between a recessed area 140 formed in a base portion 142 and a porous surface 144 such as the hole 134 and mesh 136 structure of the walls 36. The hollow chamber has holes 146 formed therethrough.

The rotating means 38 includes a motor 148 and a shaft which is driven by the motor 148 and to which the strainer basket 34 is attached. The strainer basket 34 is rotated by the motor 148 to create the centrifugal forces which strip the liquid component out of the slurry. The slurry is initially deposited against the porous surface 144 covering the hollow chamber 138. A portion of the liquid component passes through the porous surface 144 and into the hollow chamber whereby it passes out through the holes 146. The holes 146 generally provide a greater removal capacity than the porous surface of the walls 36 and thereby quickly remove an initial portion of the liquid component. The partially drained slurry then flows onto the walls 36 whereby an additional portion of the liquid component is stripped out of the slurry under the centrifugal forces and passes through the mesh 136 and holes 134 and drains from the housing 22 through the exhaust tube 72. The absence of the hollow chamber 138, and the ability to quickly remove an initial portion of the liquid component, creates problems such that the walls 36 are generally not able to handle the quantity of liquid in the slurry.

While a variety of hollow chambers 138 may be provided, the essential element is to provide a means for removing an initial portion of the liquid component to further expedite the draining of the slurry disposed in the strainer basket 34.

FIGS. 8 and 9 provide a view of the housing 22. As shown in FIG. 8, the enlarged opening 98 through the housing 22 is generally circular while an inside portion of the housing 22 near the base opening 104 has an angled surface 152. As shown in FIG. 9, the inside walls of the housing are curved and angled to promote the flow of liquid into the base opening 104.

Figure 10:
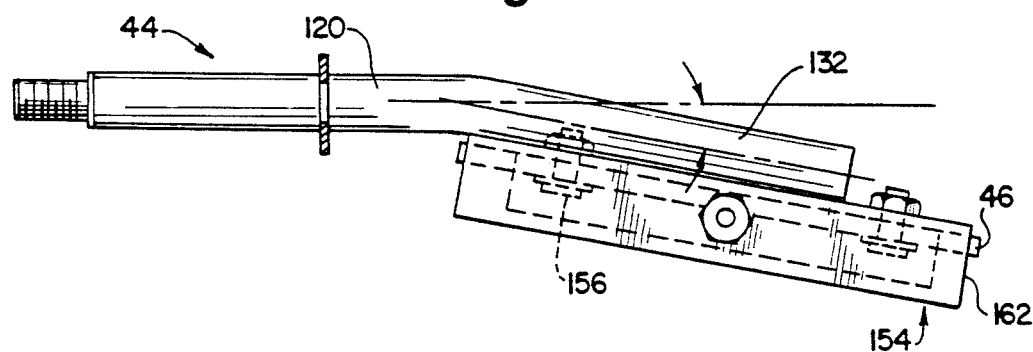
FIG. 10 is an enlarged view of an arm which includes a floating blade attached thereto.
Figure 11:
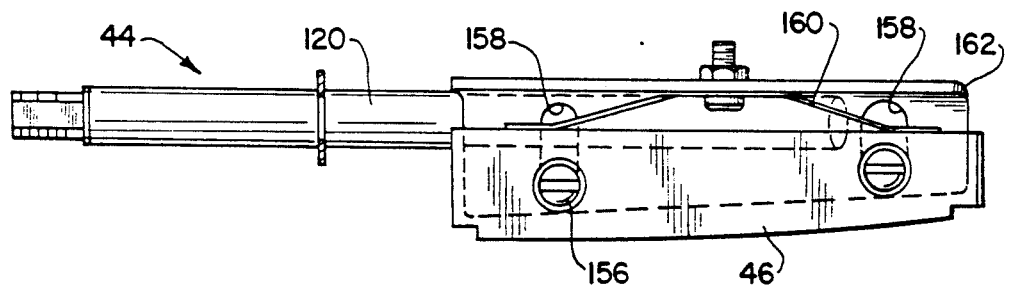
FIG. 11 is a side elevational view of the arm as shown in FIG. 10.

Turning now to FIGS. 10 and 11, the arm 44 is shown enlarged to provide a more detailed discussion thereof. As previously discussed, the arm 44 includes the shaft 120 angled at the shaft angle 132 and the stripper blade 46. As can be seen in greater detail herein, the arm 44 further includes a supporting and directing portion or frame 154. The blade is mounted to the frame 154 by means of the fasteners 156 which engage the frame in elongated holes 158. A spring member 160 is attached to the frame 154 and abuts the blade 46.

The blade is formed of a material which will not have a detrimental effect on the porous surface of the walls 36. As such, a preferred material would be a plastic material which would not detrimentally affect the mesh material 136. To further prevent damage and to provide thorough cleaning, the spring member 160 provides an added degree of flexing to the blade. As the blade is employed to remove the dried component from the strainer basket 34, the spring member 160 will allow the blade 46 to move over the range of the elongated holes 158. Further, as material is built up against the surface of the blade 46 it tends to rise above the top of the blade 46, the material will be forced downwardly back into the blade path by a top extending portion 162 of the frame 154. The plowing effect of the blade and frame 46, 154 combined with the angle 132 promotes the movement of the dried component out of the strainer basket.

In use, the disposal device of the present invention is used to receive a moist slurry comprised of a material component and a liquid component. The disposal device strips off a portion of the liquid component by applying centrifugal forces to the slurry and passing a liquid component through a porous surface while retaining a drained component. The liquid component is drained out of the disposal device and the drained component is removed from the disposal device.

As shown in the illustrated embodiment, the disposal device includes a housing which houses a rotatable strainer basket having porous walls. The strainer basket is rotated by a motor to produce centrifugal forces on a slurry deposited into the strainer basket during a cleaning cycle. The strainer basket is rotated for a predetermined period of time to separate the liquid component from the slurry. A mechanical arm extends into the strainer basket and is operated while the basket is rotating to remove the drained component from the basket.

During a cleaning cycle, slurry is deposited into the strainer basket against the back wall thereof. The back wall includes a hollow chamber which quickly removes an initial portion of the liquid component. The remaining partially drained slurry flows onto the walls of the strainer basket and has centrifugal forces imposed thereon by the rotation of the basket. An additional portion of the liquid component is separated from the slurry and drained through an exhaust tube. The arm includes a blade and a frame attached to an arm. The arm is generally parallel to the axis of rotation but has an angled portion which is angled to place the blade and frame at an angle relative to the walls of the strainer basket. When the arm is operated to remove the drained component, the arm tends to plow the drained component out of the strainer basket for appropriate disposal.

While the construction and use of preferred embodiments of the present invention has been shown and described, it is envisioned that those skilled in the art may devise various modifications to the present invention without departing from the spirit and scope of the appended claims. The invention is not intended to be limited by the foregoing description.

The invention claimed is:

1. A spent beverage brewing substance disposal device for use with a beverage brewing apparatus, said beverage brewing apparatus having means for producing a brewed beverage from a beverage brewing substance by infusion with a liquid, a drain conduit in communication with and extending from said beverage brewing means for removing a slurry of moist beverage brewing substance and waste liquid from said beverage brewing means, said disposal device comprising:

a housing having a base, walls, and an opening formed through an area of said walls communicating with said drain conduit for receiving said slurry from said beverage brewing means;

a strainer basket disposed in said housing for receiving said slurry, said strainer basket having porous surfaces through which liquid passes;

means for rotating said stainer basket operatively associated with said strainer basket, said rotating means transferring rotary motion to said strainer basket for centrifugally extracting a substantial portion of a liquid component of said slurry through said porous surfaces of said strainer basket leaving a drained material component in said strainer basket; and a drain hole in said housing for draining said liquid component centrifugally removed from said slurry out of said housing.

2. A spent beverage brewing substance disposal device as recited in claim 1, further comprising:

means for removing said drained material component from said strainer basket after draining said liquid component from said slurry.

3. A spent beverage brewing substance disposal device as recited in claim 2, wherein said housing further includes:

a disposal opening through said housing for removal of said drained material component therethrough, a portion of said removal means extending through said disposal opening for facilitating removal of said drained material component therethrough.

4. A spent beverage brewing substance disposal device as recited in claim 2, wherein said means for removing said drained material component includes:

an arm extending into said housing and into said strainer basket;

a blade attached to said arm for facilitating removal of said drained material component from an inside surface of said strainer basket; and a drive mechanism operatively associated with said arm for controllably moving said blade positioned inside of said strainer basket for removing said drained material component therefrom.

5. A spent beverage brewing substance disposal device as recited in claim 4, wherein said housing further includes:

one wall of said housing having an enlarged aperture formed therethrough, said enlarged aperture being dimensioned for receiving said strainer basket therethrough;

a cap body overlying said enlarged aperture, said cap body having a disposal opening and an arm opening extending therethrough, said arm extending through said arm opening for removal of said drained material component from said strainer basket and out through said disposal opening.

6. A spent beverage brewing substance disposal device as recited in claim 4, further comprising means for coupling said housing with said drain conduit, said coupling means selectively coupling said housing in communication with said drain conduit upon movement of said housing into a position beneath said brewing apparatus.

7. A spent beverage brewing substance disposal device as recited in claim 6, wherein said coupling means includes a funnel structure attached to said housing and extending from said housing for cooperatively communicating with said drain conduit, said funnel structure being disengageable from said drain conduit upon movement of said housing from beneath said beverage brewing apparatus.

8. A spent beverage brewing substance disposal device for use with a beverage brewing apparatus, said beverage brewing apparatus having means for producing a brewed beverage from a beverage brewing substance disposed therein by infusion with a liquid, a drain conduit in communication with and extending from said beverage brewing means for removing a slurry of moist beverage brewing substance and waste liquid from said beverage brewing means, said disposal device comprising:
   a housing having a base, walls which drain into said base, and an opening formed through an area of said walls communicating with said drain conduit for receiving said slurry from said beverage brewing means;
   a strainer basket disposed in said housing for receiving said slurry, said strainer basket having porous surfaces through which liquid passes;
   one wall of said housing having an enlarged aperture formed therethrough, said enlarged aperture being dimensioned for receiving said strainer basket therethrough;
   means for rotating said stainer basket operatively associated with said strainer basket, said rotating means transferring rotary motion to said strainer basket for centrifugally extracting a substantial portion of a liquid component of said slurry through said porous surfaces of said strainer basket leaving a drained material component in said strainer basket;
   a drain hole in said housing for draining said liquid component centrifugally removed from said slurry from said housing;
   an arm extending into said housing and into said strainer basket;
   a blade attached to said arm for facilitating removal of said drained material component from said strainer basket;
   a drive mechanism positioned proximate to said housing for controllably operating said arm to move said blade attached thereto for effecting a removing operation inside said strainer basket to remove said drained material component therefrom; and
   a cap body overlying said enlarged aperture, said cap body having a disposal opening and an arm opening extending therethrough, said arm extending through said arm opening for removal of said drained material component therethrough.

9. A spent beverage brewing substance disposal device as recited in claim 8, further comprising:
   a base structure, said housing being attached to said base structure;
   means for selectively moving said base structure relative to said brewing apparatus, said moving means providing selective movement of said base structure and attached housing beneath said beverage brewing apparatus; and
   means for coupling said housing with said drain conduit, said coupling means selectively placing said housing in communication with said drain conduit upon movement of said base structure into position beneath said brewing apparatus.

10. A spent beverage brewing substance disposal device as recited in claim 9, wherein said base structure has a base aperture formed therein communicating with said disposal opening in said cap body for receiving said drained material component therethrough;
   a collection device communicating with said base aperture when said base structure is positioned beneath said beverage brewing apparatus for receiving said drained material component passed through said base aperture.

11. A spent brewing substance disposal device as recited in claim 9, wherein said moving means includes a pivot pin extending through said base structure and engaging a portion of said beverage brewing apparatus for selectively pivotably moving said base structure relative to said drain conduit of said beverage brewing apparatus.

12. A spent beverage brewing substance disposal device as recited in claim 9, wherein said coupling means includes a funnel structure attached to said housing and extending from said housing for cooperatively communicating with drain conduit, said funnel structure being disengageable from communication with said drain conduit upon movement of said base structure from beneath said beverage brewing apparatus.

13. A spent beverage brewing substance disposal device as recited in claim 9, wherein said rotating means and said drive mechanism are attached to said base structure.

14. A method of disposing of spent beverage brewing substances produced by a beverage brewing apparatus, said method comprising the steps of:
   discharging a slurry of waste liquid and moist beverage brewing substance produced by said beverage brewing apparatus into a strainer basked retained in a housing, said strainer basket having openings formed therethrough for allowing liquid to pass therethrough and drain into said housing;
   rotating said strainer basked in said housing for centrifugally extracting a liquid component from said slurry leaving a drained material component in said strainer basket;
   draining said liquid component from said housing;
   inserting means for removing a drained component of said slurry through an opening in said strainer basket while said strainer basket is rotating; and
   directing said drained material component of said slurry out of said strainer basked using said removing means, at least a portion of said drained material component accumulating against said removing means and moving towards a mouth of said strainer basket.

15. A beverage brewing machine having slurry of waste water and a spent brewing substance, a unit for receiving the slurry and separating the brewing substance from the waste water comprising a housing, a strainer basket mounted for rotation about a predetermined axis within said housing and disposed for receiving the slurry from said drain, means for rotating said basket for separating the water from said brewing substance and scraper means shiftable toward and away from a wall of said basket while the basket is rotating for removing separated brewing substance from the basket.

16. A beverage brewing machine, as defined in claim 15, wherein said basket is disposed for rotation about a generally horizontal axis, said basket including a porous side wall, an inner end wall, and an open outer end, and said unit further including means for directing the slurry from the drain and substantially to said inner end wall.

17. A beverage brewing machine as recited in claim 16, further comprising: a foraminous end wall positioned between said open outer end and said inner end wall, said means for directing the slurry deposits said slurry onto said foraminous end wall; a drain chamber of said strainer basket being defined by said inner end wall, said foraminous end wall, and the surface of said strainer basket therebetween; a plurality of drain bores extending through said strainer basket wall in said drain chamber, each of said drain bores having a greater diameter than the pores forming the porous surface of said strainer basket.

* * * * *